United States Patent
Lee

(10) Patent No.: US 8,976,379 B2
(45) Date of Patent: *Mar. 10, 2015

(54) METHOD AND SYSTEM TO AUTOMATICALLY CONVERT A FILE FORMAT AND IMAGE FORMING APPARATUS USED IN THE SAME

(71) Applicant: SAMSUNG Electronics Co., Ltd., Suwon-si, Gyeonggi-do (KR)

(72) Inventor: Hyung-ho Lee, Suwon-si (KR)

(73) Assignee: SAMSUNG Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,962

(22) Filed: Aug. 8, 2013

(65) Prior Publication Data

US 2013/0321843 A1 Dec. 5, 2013

Related U.S. Application Data

(63) Continuation of application No. 11/545,456, filed on Oct. 11, 2006, now Pat. No. 8,526,018.

(30) Foreign Application Priority Data

Dec. 26, 2005 (KR) ........................ 10-2005-0129580

(51) Int. Cl.
*G06F 3/12* (2006.01)
*H04N 1/00* (2006.01)
*H04N 1/32* (2006.01)

(52) U.S. Cl.
CPC .......... *G06F 3/1297* (2013.01); *H04N 1/00347* (2013.01); *H04N 1/00912* (2013.01);
(Continued)

(58) Field of Classification Search
USPC ................................................. 358/1.13, 1.1
See application file for complete search history.

(56) References Cited

U.S. PATENT DOCUMENTS 5,983,013 A 11/1999 Rogers et al.
6,157,706 A 12/2000 Rachelson
(Continued)

FOREIGN PATENT DOCUMENTS

CN 1188360 7/1998
CN 1325086 12/2001
(Continued)

OTHER PUBLICATIONS

Seux Emmanuel, Method for editing an electronic mail using a facsimile device, Aug. 8, 2001, EP 1122942.*
(Continued)

*Primary Examiner* — Martin Mushambo
(74) *Attorney, Agent, or Firm* — Staas & Halsey, LLP

(57) ABSTRACT

A method to automatically convert a format of a file through an image forming apparatus, the method including displaying list of tasks executable by the image forming apparatus and a list of files stored in the image forming apparatus, selecting a task to be executed from the list of tasks and a file from one or more files stored in the image forming apparatus that is an object of the selected task, converting a format of data of the selected file into a bitmap format and converting the bitmap format of the data into a format that is compatible with the selected task, and executing the selected task using the converted file.

24 Claims, 4 Drawing Sheets

(52) U.S. Cl.
CPC .... *H04N1/32496* (2013.01); *H04N 2201/0067* (2013.01); *H04N 2201/0068* (2013.01); *H04N 2201/0094* (2013.01)
USPC .......................................................... 358/1.13

(56) References Cited

U.S. PATENT DOCUMENTS

| | | | |
|---|---|---|---|
| 6,208,427 | B1 | 3/2001 | Lee |
| 6,377,952 | B1 * | 4/2002 | Inohara et al. ........................ 1/1 |
| 6,801,340 | B1 | 10/2004 | Endo |
| 7,239,434 | B2 | 7/2007 | Endo |
| 7,839,529 | B2 | 11/2010 | Endo |
| 7,913,260 | B2 | 3/2011 | Uchikawa |
| 8,395,800 | B2 | 3/2013 | Endo |
| 2004/0190073 | A1 | 9/2004 | Kato et al. |
| 2004/0212841 | A1 | 10/2004 | Endo |
| 2005/0162685 | A1 | 7/2005 | Heiles et al. |
| 2007/0223054 | A1 | 9/2007 | Endo |
| 2011/0002011 | A1 | 1/2011 | Endo |

FOREIGN PATENT DOCUMENTS

| | | |
|---|---|---|
| CN | 1337822 | 2/2002 |
| CN | 1496078 | 5/2004 |
| CN | 1571467 | 1/2005 |
| JP | 11-134227 | 5/1999 |

OTHER PUBLICATIONS

Chinese Office Action issued Dec. 25, 2009 in CN Application No. 2006101435472.

Chinese Office Action issued Aug. 4, 2010 in CN Application No. 200610143547.2.

Chinese Office Action issued on Dec. 13, 2011 in CN Application No. 200610143547.2.

* cited by examiner

METHOD AND SYSTEM TO AUTOMATICALLY CONVERT A FILE FORMAT AND IMAGE FORMING APPARATUS USED IN THE SAME

CROSS-REFERENCE TO RELATED APPLICATIONS

This application is a Continuation of prior application Ser. No. 11/545,456 filed on Oct. 11, 2006 in the United States Patent and Trademark Office, which claims priority under 35 U.S.C. §119(a) from Korean Patent Application No. 2005-129580, filed on Dec. 26, 2005, in the Korean Intellectual Property Office, the contents of which are incorporated herein by reference in its entirety.

BACKGROUND OF THE INVENTION

1. Field of the Invention

The present general inventive concept relates to a method and system to automatically convert a file format and to perform a task through an image forming apparatus, and an image forming apparatus used in the same. More particularly, the present general inventive concept relates to a method and system to automatically convert a format of a file stored in an image forming apparatus into data that is compatible with a task a user wants to execute and to execute the task, and an image forming apparatus used in the same.

2. Description of the Related Art

In general, image forming apparatuses include a storage device having a high storage capacity, such as a hard disk, to store data relating to an image forming task. The image forming apparatuses include printers, photocopiers, facsimile machines, and combination apparatuses. The image forming apparatuses store different formats of data depending on different tasks to be executed based on the data. For example, for printing tasks, HCT compression files, Jbig compression files, and LZW compression files are stored. For facsimile tasks, MMR compression files, MR compression files, MH compression files, and Jbig compression files are stored. For e-mailing tasks, Jpeg files, Tiff files, and BMP (bitmap) files are stored.

For example, if a user wants to send a document received through a facsimile machine via e-mail, the user prints the document received through the facsimile machine, scans the printed document, and transmits a scanned image file via e-mail. That is, the document received through the facsimile machine can not be directly transmitted via e-mail because the formats of facsimile and e-mail data are not the same.

As described above, to use a specific file stored in a storage device for a different task, the specific file has to be printed, scanned, and then used for the task. However, this causes degradation of image quality because an original file is not used, and also printing paper and developer, such as ink and toner, are likely to be wasted.

SUMMARY OF THE INVENTION

The present general inventive concept provides a method and system to automatically convert a format of a file stored in an image forming apparatus into data that is compatible with a task a user wants to execute and to execute the task, and an image forming apparatus used in the same.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to automatically convert a format of a file using an image forming apparatus, including selecting a task to be executed by the image forming apparatus, and selecting a file from one or more files stored in the image forming apparatus that is an object of the selected task from the one or more files stored in the image forming apparatus, converting a format of data of the selected file into a format that is compatible with the selected task, an executing the selected task using the converted file.

The selected task may be one of printing, scanning, photocopying, facsimile sending, and e-mailing tasks.

The one or more files stored in the image forming apparatus may include files that are stored after being used in a task of printing, scanning, photocopying, facsimile sending/receiving, e-mailing, and file receiving from a host to control the image forming apparatus.

The method may further comprise displaying a list of tasks executable by the image forming apparatus and a list of files stored in the image forming apparatus, and the selecting of the task may include selecting a task from the displayed list of tasks and selecting a file may be selected from the displayed list of files.

The converting of the format of the data may include converting the format of the data of the selected file into a bitmap format, and converting the bitmap format of the data into the format that is compatible with the selected task.

The displaying operation may include displaying icons representing tasks of the list of tasks, and showing option information necessary to execute the tasks.

The foregoing and/or other aspects and utilities of the present general inventive concept may also be achieved by providing an image forming apparatus to automatically convert a file format and execute a task, including a storage unit to store at least one file, a input unit through which a user selects a task to be executed and a file from the at least one file stored in the storage unit that is an object of the selected task, a data converter to convert a format of data of the selected file into a format that is compatible with the selected task, and a controller to control the task to be executed using the converted file.

The selected task may be one of printing, scanning, photocopying, facsimile sending, and e-mailing tasks.

The storage unit may store files that have been used in a task of printing, scanning, photocopying, facsimile sending/receiving, and file receiving from a host to control the image forming apparatus.

The image forming apparatus may further include a display unit to display a list of tasks executable by the image forming apparatus and a list of files stored in the storage unit, and the list of tasks may be stored in the storage unit and a user may select one task from the list of tasks and one file from the list of files, which are displayed on the display unit, through the input unit.

The data converter may convert the format of the data of the selected file into a bitmap format and may convert the bitmap format of the data into the format that is compatible with the selected task.

The display unit may display icons representing tasks of the list of tasks and option information necessary to execute the tasks.

The foregoing and/or other aspects and utilities of the present general inventive concept may also be achieved by providing a system to automatically convert a file format using an image forming apparatus, comprising an input unit through which a user selects a task to execute using the image forming apparatus and a file from one or more files stored in the image forming apparatus that is an object of the selected task, a host having a communication interface to transmit the selected task and the selected file to the image forming apparatus, and the image forming apparatus to convert a format of data of the transmitted file into a format that is compatible with the selected task and to execute the transmitted task using the converted file.

The selected task may be one of printing, scanning, photocopying, facsimile sending, and e-mailing tasks.

The one or more files stored in the image forming apparatus may include a file that is stored after being used in a task of printing, scanning, photocopying, facsimile sending/receiving, e-mailing, and file receiving from the host.

The host may further include a display unit to display a list of tasks executable by the image forming apparatus and a list of files stored in the image forming apparatus, the list of tasks and the list of files may be received from the image forming apparatus through the communication interface, and the user may select one task from the list of tasks and one file from the list of files, which are displayed on the display unit, through the input unit.

The display unit may display icons representing the tasks of the list of tasks and option information necessary to execute the tasks.

The foregoing and/or other aspects and utilities of the present general inventive concept may also be achieved by providing an image forming apparatus, including a control unit to determine whether a format of a selected file is compatible with a selected task, and a conversion unit to convert the format of the selected file to a compatible format compatible with the selected task using the data converter when the format of the selected file is not compatible with the selected task, and the control unit controls the image forming apparatus to perform the selected task with the selected file when the format of the selected file is compatible with the selected task, and controls the image forming apparatus to perform the selected task with the converted file when the format of the selected file is not compatible with the selected task.

The image forming apparatus may further include a storage unit, and the control unit may extract the selected file from the storage unit of the image forming apparatus to determine whether the format of the extracted file is compatible with the selected task. The storage unit may be an internal storage unit internal to the image forming apparatus. The storage unit may be an external storage unit external to the image forming apparatus.

The conversion unit may convert the format of the selected file directly to the compatible format, and the control unit may control the image forming apparatus to perform the selected task with the converted file using the image forming apparatus. The conversion unit may convert the format of the selected file indirectly to the compatible format, and the control unit may control the image forming apparatus to perform the selected task with the converted file using the image forming apparatus. The conversion unit may convert the format of the selected file to an intermediate format and may convert the intermediate format of the selected file to the compatible format, and the image forming apparatus may perform the selected task with the file having the compatible format.

The image forming apparatus may further include a display unit to display a list of one or more tasks and a list of one or more files, and the selected task and the selected file may be selected from the displayed list of one or more tasks and the displayed list of one or more files, respectively. The image forming apparatus may further include at least one predetermined task unit to perform the selected task with the selected file when the format of the selected file is compatible with the selected task, and with the converted file when the format of the selected file is not compatible with the selected task. The at least one predetermined task unit may be selected from a printing unit, a facsimile unit, an e-mail unit, a scanning unit, and a photocopying unit.

The foregoing and/or other aspects and utilities of the present general inventive concept may also be achieved by providing an image forming system, including an image forming apparatus including a control unit to determine whether a format of a selected file is compatible with a selected task and a conversion unit to convert the format of the selected file to a compatible format compatible with the selected task using the data converter when the format of the selected file is not compatible with the selected task in which the control unit controls the image forming apparatus to perform the selected task with the selected file when the format of the selected file is compatible with the selected task, and controls the image forming apparatus to perform the selected task with the converted file when the format of the selected file is not compatible with the selected task, and a host device including a display unit to display a list of one or more tasks and a list of one or more files in which the selected task and the selected file are selected from the displayed list of one or more tasks and the displayed list of one or more files, respectively.

The foregoing and/or other aspects and utilities of the present general inventive concept may also be achieved by providing a method of performing a selected task using a selected file and an image forming apparatus including a data converter, the method including determining whether a format of a selected file is compatible with a selected task, performing the selected task with the selected file using the image forming apparatus when the format of the selected file is compatible with the selected task, and converting the format of the selected file to a compatible format compatible with the selected task using the data converter and performing the selected task with the converted file using the image forming apparatus when the format of the selected file is not compatible with the selected task.

The determining of whether the format of the selected file is compatible with the selected task may include extracting the selected file from an internal storage unit of the image forming apparatus, and determining whether the format of the extracted file is compatible with the selected task. The determining of whether the format of the selected file is compatible with the selected task may include extracting the selected file from an external storage unit external to the image forming apparatus, and determining whether the format of the extracted file is compatible with the selected task.

The converting of the format of the selected file may include converting the format of the selected file directly to the compatible format using the data converter and performing the selected task with the converted file using the image forming apparatus. The converting of the format of the selected file may include converting the format of the selected file indirectly to the compatible format using the data converter and performing the selected task with the converted file using the image forming apparatus. The converting of the format of the selected file indirectly to the compatible format may include converting the format of the selected file to an intermediate format using the data converter, and converting the intermediate format of the selected file to the compatible format using the data converter and performing the selected task with the file having the compatible format using the image forming apparatus.

The method may further include displaying a list of one or more tasks and a list of one or more files on a display unit of the image forming apparatus, and the selected task and the selected file may be selected from the displayed list of one or more tasks and the displayed list of one or more files, respectively. The method may further include displaying a list of one or more tasks and a list of one or more files on a display unit of a host connected with the image forming apparatus, and the selected task and the selected file may be selected from the displayed list of one or more tasks and the displayed list of one or more files, respectively.

The method may further include selecting a predetermined task unit of the image forming apparatus to perform the selected task with the selected file when the format of the selected file is compatible with the selected task, and with the converted file when the format of the selected file is not compatible with the selected task. The predetermined task unit may be at least one of a printing unit, a facsimile unit, an e-mail unit, a scanning unit, and a photocopying unit.

The foregoing and/or other aspects and utilities of the present general inventive concept may also be achieved by providing a method of automatically converting a format of a file through an image forming apparatus, including receiving a request to perform a task among a plurality of tasks that can be performed together with a file among one or more stored files to be associated with the task, converting the file data to a format compatible with the task, and executing the task using the converted file.

The task requested to be performed may be one of a printing, scanning, photocopying, facsimile sending, and e-mailing. The one or more files stored in the image forming apparatus may include files that are stored after being used in a task of printing, scanning, photocopying, facsimile sending/receiving, e-mailing, and file receiving from a host to control the image forming apparatus. The file data may be compatible with the requested task when the formats of the data are the same. The file data may be compatible with the requested task when the requested task and the file can be received together in a same transmission.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
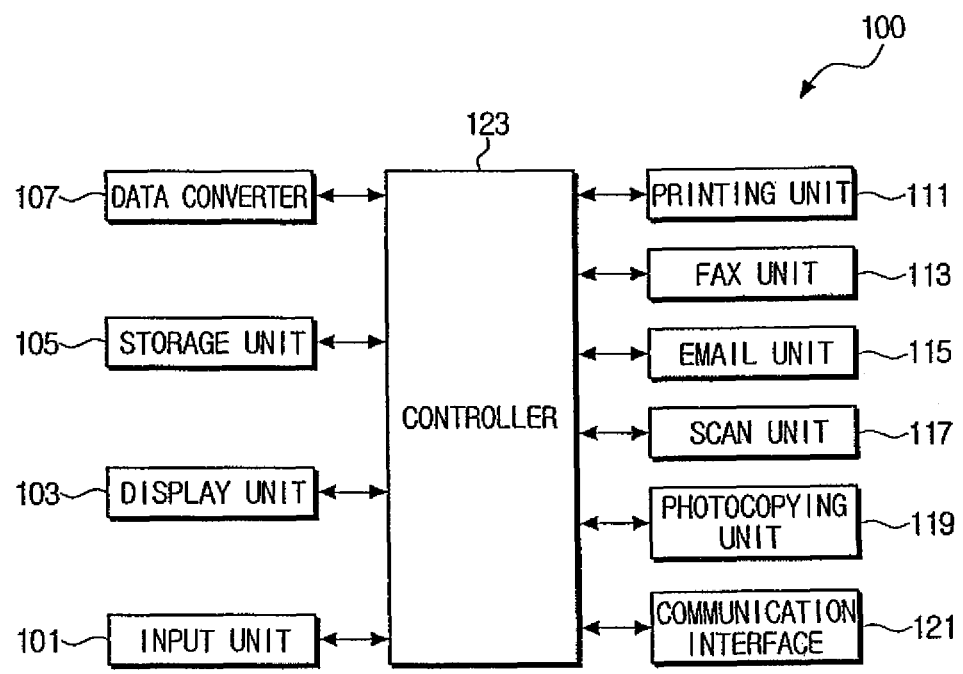
FIG. 1 is a block diagram illustrating an image forming apparatus, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus 100, according to an embodiment of the present general inventive concept. Referring to FIG. 1, the image forming apparatus 100 includes an input unit 101, a display unit 103, a storage unit 105, a data converter 107, a communication interface 121, and a controller 123.

The input unit 101 may be provided with at least one manipulation button to receive various user commands. For example, the input unit 101 may be an operation panel (OPE) or a touch panel that is a small flat type panel having a pressure sensor and is substituted for a mouse. The input unit 101 may be disposed on the display unit 103, which may be, for example, an LCD panel. When a user touches the input unit 101 with a finger or an object, such as a pen, the input unit 101 perceives the location of the finger or the object, such as the pen.

The input unit 101 receives a task a user wants to execute through the image forming apparatus 100 and a file that is an object of the task. The file may be a file stored in the storage unit 105. Alternatively, the file may be input by the user.

A signal according to a user command input through the input unit 101 is transmitted to the controller 123. The controller 123 controls the image forming apparatus 100 in response to the signal according to the input user command.

The display unit 103 displays various messages in response to the user command or under the control of the controller 123. As discussed above, the display unit 103 may be an LCD panel. The display unit 103 may display a list of tasks executable by the image forming apparatus 100 and a list of files stored in the storage unit 105. The list of tasks may be stored in the storage unit 105.

The storage unit 105 can store a file that has been previously used for a task, such as printing, scanning, facsimile sending/receiving, e-mailing, and file receiving from a host (not illustrated) to control the image forming apparatus 100. For example, data received via facsimile can be stored in the storage unit 105, and the stored facsimile data may then be sent via e-mail as an attachment to the e-mail.

The storage unit 105 may store a list of tasks executable by the image forming apparatus 100, such as printing, scanning, photocopying, facsimile sending, and e-mailing. Option information necessary to perform each task can be stored together with the list of tasks. If one task has different types of option information, the storage unit 105 may store the task multiple times for each of the different types of option information. For example, a 2-UP printing task and a 4-UP printing task belong to the same "printing" task but have different option information. Therefore, the storage unit 105 may store the two tasks individually according to the two different types of option information. That is, the storage unit 105 can store the 2-UP printing task and the corresponding option information under a file name of "print 1" and can store the 4-UP printing task and the corresponding option information under a file name of "print 2", even though the 2-UP printing task and the 4-UP printing task are both printing tasks.

The storage unit 105 may be an internal memory built in the image forming apparatus 100, such as a RAM, a ROM, a flash memory, or an HDD. Alternatively, the storage unit 105 may be an external memory, such as a removable HDD connected with the image forming apparatus 100, a memory card (such as flash memory, including, but not limited to, M/S, xD, SD flash memory), or a USB memory.

The data converter 107 extracts the input file received through the input unit 101 from the storage unit 105 and converts the file into data that is compatible with the task received through the input unit 101. The data converter 107 can convert data of the input file into bitmap data and can convert the bitmap data into data that is compatible with the task.

The communication interface 121 is connected with an external device via a wired or wireless network to receive and transmit data, such as print data, facsimile data, and e-mail data.

The image forming apparatus 100 can include one or more of a printing unit 111 to perform a printing task, a fax unit 113 to send and receive a facsimile, an e-mail unit 115 to send and receive an e-mail, a scan unit 117 to perform a scanning task, and a photocopying unit 119 to perform a photocopying task.

The controller 123 controls all operations of the image forming apparatus 100 such that the units of the image forming apparatus 100 perform their respective tasks as described above.

Figure 2:
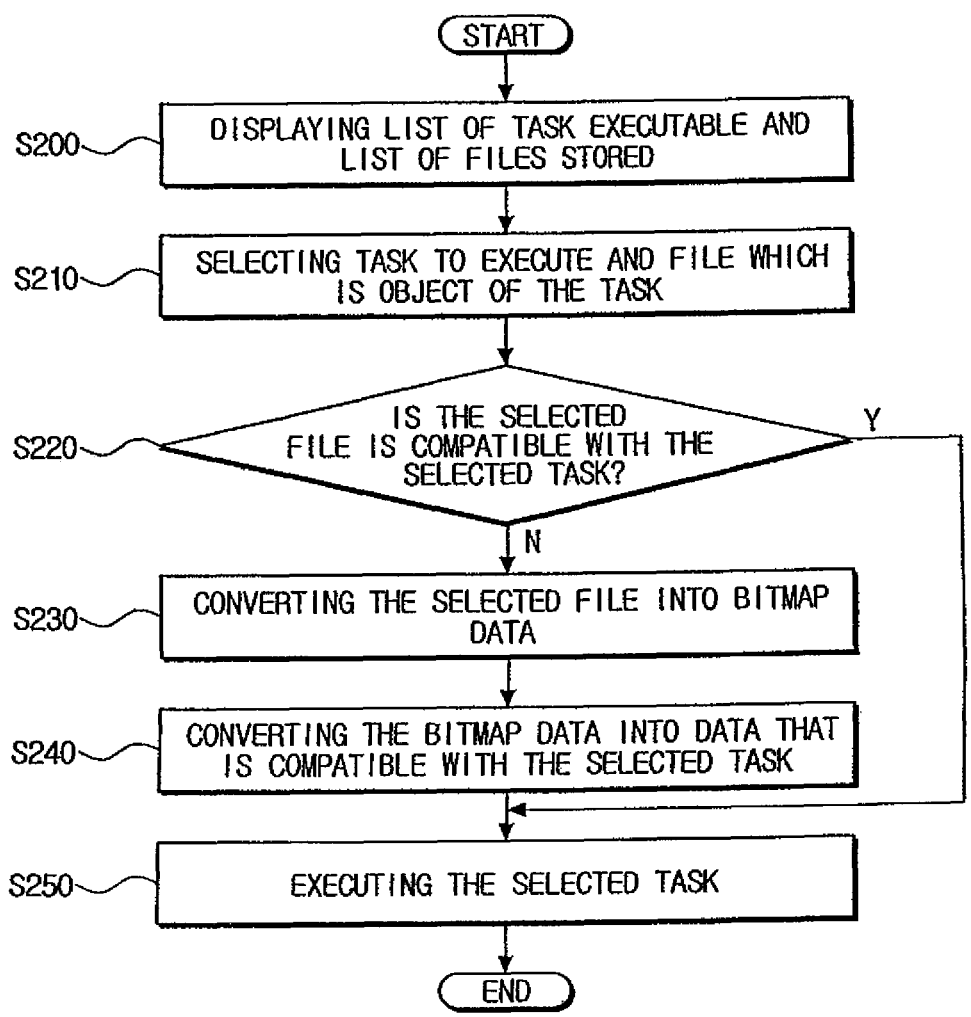
FIG. 2 is a flowchart illustrating a method to automatically convert a file format and to execute a task through the image forming apparatus of FIG. 1, according to an embodiment of the present general inventive concept.
Figure 3:
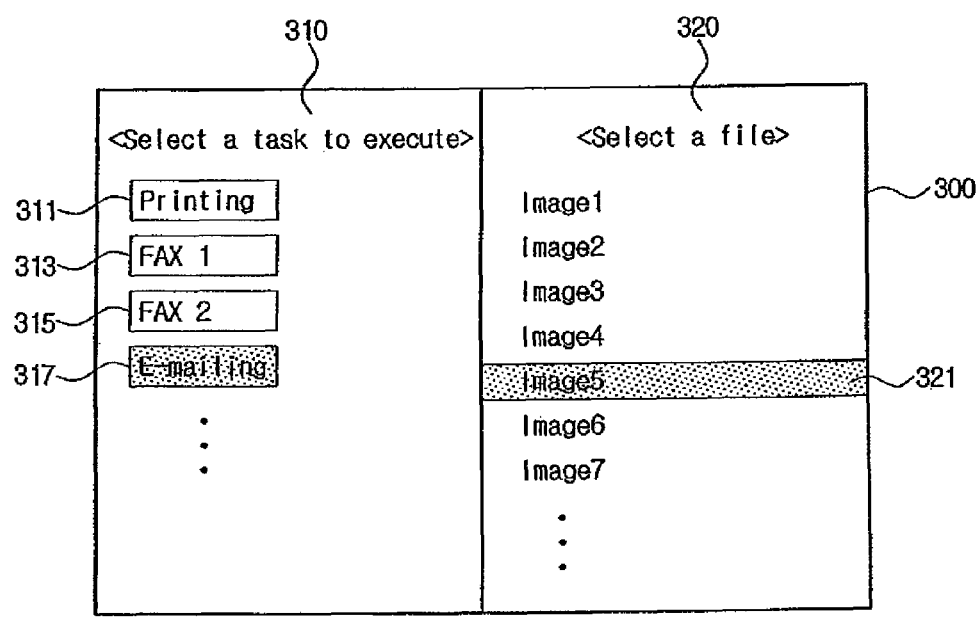
FIG. 3 is a view illustrating a user interface of the image forming apparatus of FIG. 1, according to an embodiment of the present general inventive concept.

FIG. 2 is a flowchart illustrating a method to automatically convert a file format and to execute a desired task through the image forming apparatus 100 of FIG. 1, according to an embodiment of the present general inventive concept, and FIG. 3 is a view illustrating a user interface 300 of the image forming apparatus of FIG. 1, according to an embodiment of the present general inventive concept.

Referring to FIGS. 1-3, a display unit 103 can display a list of tasks 310 executable by the image forming apparatus 100 and a list of files 320 stored in the storage unit 105 at operation S200. The display unit 103 can display icons representing the list of tasks 310 in order for a user to easily select a task to execute.

The storage unit 105 can store a file that has been previously used for a task, such as printing, scanning, photocopying, facsimile sending/receiving, e-mailing, and file receiving from a host (not illustrated) to control the image forming apparatus 100. For example, the image forming apparatus 100 can store a file that has been received from the host (not illustrated) and printed, or can store an image file that is obtained by scanning a document. Also, the storage unit 105 may store a file that has been received via facsimile or e-mail.

The list of tasks 310 executable by the image forming apparatus 100 with respect to the files stored in the storage unit 105 can include "Printing" 311, facsimile sending, such as "FAX 1" 313 and "FAX 2" 315, and "E-mailing" 317. The list of tasks 310 can be stored in the storage unit 105.

Each task included in the list of tasks 310 includes option information necessary to execute the corresponding task. For example, the printing task "Printing" 311 may include one or more of the following option information: paper size, number of copies, printing orientation, and N-UP. The facsimile sending tasks "FAX 1" 313 and "FAX 2" 315 may include one or more of the following option information: fax number of receiving side, resolution, and sending side information. Furthermore, FAX 1" 313 and "FAX 2" 315 do not include identical option information and are thus listed individually in the list of tasks 310. The e-mailing task "E-mailing" 317 can include option information, such as e-mail address of receiving side and sending side information.

As described above, the same type of task may include different option information. For example, different facsimile sending tasks may have different fax numbers, different resolution, and/or different sending side information. Accordingly, different task icons representing the different option information may be set and used. If there is frequently used option information, a task icon representing the frequently used option information is set such that a user is not required to input the option information for each use thereof. Accordingly, the user's convenience of performing different tasks is improved. For example, in FIG. 3 the facsimile sending task is divided into the icon "FAX 1" 313 and the icon "FAX 2" 315 because "FAX 1" 313 and "FAX 2" 315 have different option information. Each icon may be named such that a user easily perceives the option information. For example, icons such as "Fax (receiver Hong kildong/200 dpi)", "Fax (receiver Kim chulsoo/300 dpi)", "Print (2-UP)", "Print (4-UP)" may be displayed such that different users can easily perceive desired option information.

According to another embodiment of the present general inventive concept, if a user selects one task from the list of tasks 310, for example, the printing task 311, the user is enabled to input further option information or to change the option information through a user interface, such as the user interface 300 illustrate in FIG. 3.

At operation S210, the user selects a task to execute from the list of tasks 310 displayed at operation S200 through the input unit 101, and selects one file from the list of files displayed at operation S200 that is an object of the task. For example, if a user wants to attach a file "Image 5," which has been received through facsimile and stored, to an e-mail and send the file "Image 5" via e-mail, the user selects the "E-mailing" task 317 and file "Image 5" 321, as illustrated in FIG. 3.

Referring again to FIGS. 1-3, the controller 123 determines whether the selected file 321 is compatible with the selected task 317 at operation S220.

If the selected file 321 is compatible with the selected task 317 (operation S220:Y), the controller 123 controls one of the printing unit 111, the fax unit 113, the e-mail unit 115, the scan unit 117, and the photocopying unit 119 to execute the selected task 317 with respect to the selected file 321 at operation S250.

If the selected file 321 is not compatible with the selected task 317 (operation S220: N), the date converter 107 converts data of the selected file 321 into data that is compatible with the selected task 317. For example, the data converter 107 can convert the data of the selected file 321 into bitmap data at operation S230 and can convert the bitmap data into data that is compatible with the selected task 317 at operation S240. The file "Image 5" 321 is received via facsimile and can be stored in an MMR compression format, an MR compression format, or an MH compression format. However, since the selected "E-mailing" task 317 requires a different format, such as a Jpeg format, a Tiff format, or a BMP format, the "E-mailing" task 317 cannot be directly executed with respect to the file "Image 5" 321. Therefore, the data convert 107 converts the file "Image 5" 321 into bitmap data at operation S230 and converts the bitmap data into data that is compatible with the "E-mailing" task 317 at operation S240.

Alternatively, the data converter 107 can convert the data of the selected file 321 directly into data that is compatible with the selected task 317 at operation S240. For example, if the selected file is a bitmap file, the data convert 107 can convert the selected bitmap file into data that is compatible with the "E-mailing" task 317 at operation S240.

One of the units of the image forming apparatus 100, such as one of the printing unit 111, the fax unit 113, the e-mail unit 115, the scan unit 117, and the photocopying unit 119 executes the selected task 317 with respect to the file converted through the operations S230 and S240 at operation S250.

In another example, referring to FIGS. 1-3, if a user wants to print a file "Image 3" (see FIG. 3) that has been created by scanning a certain document and stored in the storage unit 105, the user selects the "Printing" task 311 and the file "Image 3" from the lists displayed on the user interface 300 at operation S210. The file "Image 3" is a scanned image file and may be a Jpeg, Tiff, or BMP file. However, the printing task 311 may require files compressed in a HCT format, a Jbig format, and an LZW format, which are not identical to the format of the file "Image 3" (operation S220: N). Therefore, the data converter 107 converts the data of the file "Image 3" into bitmap data at operation S230 (unless the file "Image 3" is already a bitmap file) and converts the bitmap data into data that is compatible with the "Printing" task 311 at operation S240. The printing unit 111 executes the "Printing" task 311 with respect to the converted file "Image 3" under the control of the controller 123 at operation S250.

In still another example, referring to FIGS. 1-3, a user may want to send a file "Image 7" by facsimile that has been created by scanning a certain document and stored in the storage unit 105. The icon "FAX 1" 313 can include a fax number 'xxxx-xxxx-xxxx' and a resolution of 200 dpi, and the icon "FAX 2" 315 can include a fax number 'yyyy-yyyy-yyyy' and a resolution 300 dpi. The user may select the facsimile sending task "FAX 2" 315 and the file "Image 7" from the lists displayed on the user interface 300 at operation S210. The file "Image 7" is a scanned image file, and thus is typically stored in a Jpeg format, a Tiff format, or a BMP format. However, the facsimile sending task may require files stored in an MMR compression format, an MR compression format, an MH compression format, or a Jbig compression format, none of which are identical to the format of the file "Image 7" (operation S220: N). Therefore, the data converter 107 converts the data of the file "'Image 7" into bitmap data at operation S230 (unless the data of the file "'Image 7" is already bitmap data) and converts the bitmap data into data that is compatible with the facsimile sending task at operation S240. The fax unit 113 executes the facsimile sending task with respect to the converted file "Image 7" under the control of the controller 123 at operation S250.

In another embodiment of the present general inventive concept, a host to control the image forming apparatus 100 may perform the operations S200 and S210. Embodiments in which a host performs operations S200 and S210 will now be described with reference to FIGS. 4 and 5.

Figure 4:
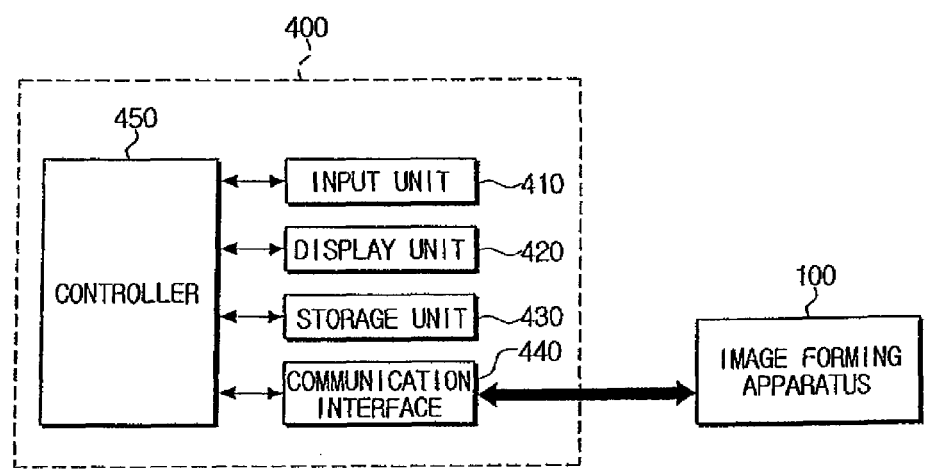
FIG. 4 is a block diagram illustrating a system including a host and an image forming apparatus, according to another embodiment of the present general inventive concept.
Figure 5:
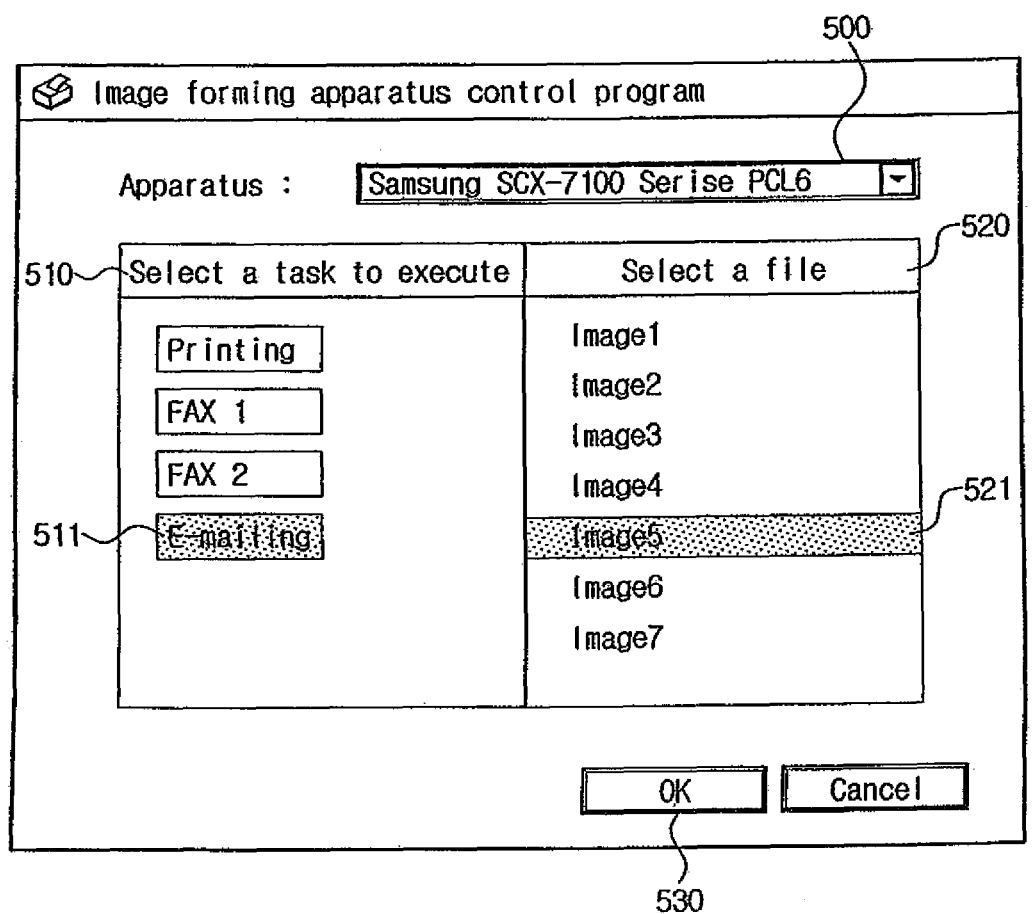
FIG. 5 is a view illustrating a user interface of the host of the system of FIG. 4, according to an embodiment of the present general inventive concept.

FIG. 4 is a block diagram illustrating a system including a host 400 and an image forming apparatus 100, according to another embodiment of the present general inventive concept, and FIG. 5 is a view illustrating a user interface of the host 400 of FIG. 4, according to another embodiment of the present general inventive concept.

The host 400 to control the image forming apparatus 100 may include an input unit 410, a display unit 420, a storage unit 430, a communication interface 440, and a controller 450.

The display unit 420 displays a user interface, such as the user interface illustrated in FIG. 5.

A user selects an image forming apparatus 500 to execute a task, such as printing, facsimile sending, and e-mailing, using the input unit 410. The selected image forming apparatus 500 may be the image forming apparatus 100 illustrated in FIG. 4.

The host 400 requests the image forming apparatus 100 to send a list of tasks 510 and a list of files 520 through the communication interface 440 under the control of the controller 450.

The display unit 420 displays the list of tasks 510 received from the image forming apparatus 100 through the communication interface 440 and executable by the image forming apparatus 100 and the list of files 520 stored in the image forming apparatus 100 under the control of the controller 450. The display unit 420 can display icons representing the list of tasks 510 such that a user can easily select a task to be executed.

The user selects the task to be executed from the list of tasks 510 and selects a file from the list of files 520 that is an object of the selected task, using the input unit 410. For example, if a user wants to send the file "Image 5", which has been received via facsimile and stored, via e-mail as an attachment thereto, the user selects an "E-mailing" task 511 and a file "Image 5" 521, as illustrated in FIG. 5.

A user may select an OK button 530, and the controller 450 then transmits the selected task 511 and the file 521 to the image forming apparatus 100 through the communication interface 440.

The image forming apparatus 100 performs the operations from S220 to S250 (see FIG. 2) after receiving the selected task 511 and the file 521.

The storage unit 430 of the host 400 may temporarily store data created during the operation of the host 400 under the control of the controller 450. For example, the storage unit 430 may temporarily store the list of tasks 510 and the list of files 520 received from the image forming apparatus through the communication interface 440.

According to embodiments of the present general inventive concept, a format of a file stored in an image forming apparatus can be automatically converted into data that is compatible with a task a user wants to execute so that the task can be directly executed.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method to convert a file stored in an image forming apparatus and to transmit the converted file to a remote device, comprising:
displaying a plurality of tasks to be executed by the image forming apparatus;
receiving a user input to select an emailing task from among the displayed plurality of tasks to transmit a file via an email transmission;
receiving a user input to select a file stored in a format compatible to a task different from the selected emailing task, from among a plurality of files stored in the image forming apparatus, to be transmitted to a remote device via the email transmission;
converting the format of data of the selected file to be transmitted to the remote device via the email transmission into an intermediate format and converting the format of the selected file from the intermediate format into one of a plurality of formats predefined for the emailing task; and
transmitting the converted file to the remote device via the email transmission.

2. The method according to claim 1, wherein the intermediate format is a bitmap format.

3. The method according to claim 1, wherein the plurality of formats predefined for the emailing task includes a JPEG format.

4. The method according to claim 1, wherein the plurality of formats predefined for the emailing task includes a TIFF format.

5. The method according to claim 1, wherein the plurality of formats predefined for the emailing task includes a BMP format.

6. The method according to claim 1, wherein the plurality of formats predefined for the emailing task includes a JPEG format and a TIFF format.

7. The method according to claim 1, wherein the plurality of formats predefined for the emailing task includes a JPEG format, a TIFF format, and a BMP format.

8. The method according to claim 1, wherein, the selected file is converted from one of an MMR compression format, an MR compression format, or an MH compression format into the one of the plurality of formats predefined for the emailing task.

9. The method according to claim 1, wherein before the format of the selected file is converted, the format of the selected file is a bitmap format.

10. The method according to claim 9, wherein the selected file is converted from the bitmap format to one of a JPEG format and a TIFF format.

11. An image forming apparatus to convert a format of a stored file to transmit the stored file, comprising:
　a storage unit to store at least one file in a first format;
　a display unit to display a list of a plurality of tasks executable by the image forming apparatus and a list of files stored in the storage unit;
　an input unit to receive a user selection of an emailing task from among the plurality of tasks, and to receive a user selection of a file stored in a format compatible to a task different from the selected emailing task to be transmitted to a remote device via the emailing task;
　a data converter to convert the format of the selected file into an intermediate format and convert the format of the selected file from the intermediate format into one of a plurality of formats predefined for the emailing task; and
　a controller to control transmission of the converted file to the remote device via email.

12. The image forming apparatus of claim 11, wherein the intermediate format is a bitmap format.

13. The image forming apparatus of claim 11, wherein the plurality of formats predefined for the emailing task includes a JPEG format.

14. The image forming apparatus of claim 11, wherein the plurality of formats predefined for the emailing task includes a TIFF format.

15. The image forming apparatus of claim 11, wherein the plurality of formats predefined for the emailing task includes a BMP format.

16. The image forming apparatus of claim 11, wherein the plurality of formats predefined for the emailing task includes a JPEG format and a TIFF format.

17. The image forming apparatus of claim 11, wherein the plurality of formats predefined for the emailing task includes a JPEG format, a TIFF format, and a BMP format.

18. The image forming apparatus of claim 11, wherein the data converter converts the selected file from one of an MMR compression format, an MR compression format, or an MH compression format into the one of the plurality of formats predefined for the emailing task.

19. The image forming apparatus of claim 11, wherein before the data converter converts the format of the selected file, the format of the selected file is a bitmap format.

20. The image forming apparatus of claim 19, wherein the selected file is converted from the bitmap format to one of a JPEG format and a TIFF format.

21. A system to convert a file format of a file stored in an image forming apparatus and to transmit the converted file, comprising:
　a host to receive a file via email in one of a plurality of formats predefined for email transmission; and
　an image forming apparatus, comprising:
　　a display unit to display a list of a plurality of tasks executable by the image forming apparatus and a list of files stored in the image forming apparatus;
　　an input unit to receive a user selection of an emailing task from among the plurality of tasks and a selected file stored in a format compatible to a task different from the selected emailing task to email from among the list of files stored in the image forming apparatus;
　　a data converter to convert the format of the selected file into an intermediate format and convert the format of the selected file from the intermediate format into one of a plurality of formats predefined for email transmission; and
　　a controller to control transmission of the converted file to the host via email.

22. The system of claim 21, wherein the intermediate format is a bitmap format.

23. The system of claim 21, wherein the plurality of formats predefined for email transmission include a JPEG format, a TIFF format, and a BMP format.

24. The system of claim 21, wherein the data converter converts the selected file from one of an MMR compression format, an MR compression format, or an MH compression format into the one of the plurality of formats predefined for email transmission.

* * * * *